United States Patent
Cookson, Jr. et al.

(10) Patent No.: US 7,249,129 B2
(45) Date of Patent: Jul. 24, 2007

(54) CORRELATING GENEALOGY RECORDS SYSTEMS AND METHODS

(75) Inventors: Bennett Cookson, Jr., Orem, UT (US); Ken Boyer, Cedar Hills, UT (US); Jerry Collings, American Fork, UT (US); James Mark Hamilton, Provo, UT (US); Kendall J. Jefferson, Orem, UT (US); Grant Parkinson, Orem, UT (US); Douglas T. Reid, Orem, UT (US); Daren Thayne, Orem, UT (US); Michael J. Wolfgramm, Pleasand Grove, UT (US)

(73) Assignee: The Generations Network, Inc., Provo, UT (US)

( * ) Notice: Subject to any disclaimer, the term of this patent is extended or adjusted under 35 U.S.C. 154(b) by 513 days.

(21) Appl. No.: 10/748,439

(22) Filed: Dec. 29, 2003

(65) Prior Publication Data

US 2005/0149522 A1    Jul. 7, 2005

(51) Int. Cl.
*G06F 7/00* (2006.01)
*G06F 17/30* (2006.01)
*G06F 12/00* (2006.01)

(52) U.S. Cl. .................. 707/5; 707/1; 707/2; 707/6; 707/101; 707/200

(58) Field of Classification Search .................. 707/1, 707/2, 6, 5, 101, 200
See application file for complete search history.

(56) References Cited

U.S. PATENT DOCUMENTS

| 4,817,036 | A | * | 3/1989 | Millett et al. | .................. 707/1 |
| 6,389,429 | B1 | * | 5/2002 | Kane et al. | .................. 707/200 |
| 6,570,567 | B1 | | 5/2003 | Eaton | .................. 345/428 |
| 6,760,731 | B2 | * | 7/2004 | Huff | .................. 707/101 |
| 6,947,933 | B2 | * | 9/2005 | Smolsky | .................. 707/6 |
| 2002/0032687 | A1 | | 3/2002 | Huff | .................. 707/104.1 |
| 2002/0156779 | A1 | * | 10/2002 | Elliott et al. | .................. 707/6 |

OTHER PUBLICATIONS

El Rosenbaum: "Name Permutation Generator" Computers in Genealogy, vol. 7, No. 12, Dec. 2002, XP009046831 London, GB ISSN: 0263-3248.

M H May: "Using a relational database for a one-name study" Computers in Genealogy, vol. 7, No. 2, Jun. 2000, XP009046832 London, GB ISSN: 0263-3248.

* cited by examiner

*Primary Examiner*—Don Wong
*Assistant Examiner*—Marie Antoinette Cabucos
(74) *Attorney, Agent, or Firm*—Townsend and Townsend and Crew LLP

(57) ABSTRACT

A method of consolidating genealogy records includes partitioning the records using at least one index file to form one or more partitions, sorting the records in a partition based on a data element in the records, comparing records within a sort range, based on the comparison, identifying same person records, consolidating information in the same person records, receiving a request from a user to view at least a portion of the consolidated information for a particular group of same person records, and sending a file that includes the portion to the user.

20 Claims, 25 Drawing Sheets

Relationship Correlation Algorithm

The following algorithm is used to adjust the score of an individual comparison to another individual as determined during individual correlation by taking into account the comparison scores of related individuals.

$$P(s|f,m) = \frac{P(f)P(m)P(s)}{P(f)P(m)P(s) + P(f')P(m')P(s')}$$

Where
From Individual Correlation
$P(s) = I(1-1) \Longleftrightarrow I(2-1)$
$P(f) = I(1-2) \Longleftrightarrow I(2-2)$
$P(m) = I(1-3) \Longleftrightarrow I(2-3)$ Relationship Correlation Factor
$P(s') = 1 - P(s)$
$P(f') = 1 - P(f)$
$P(m') = 1 - P(m)$

John William Jefferson

AKA: John Jefferson

Birth / Death

| | | |
|---|---|---|
| Birth | 03 Dec 1870 | Lineville Ia. Mercer County Mo. |
| Death | 09 Aug 1951 | Cannon City Fremont County Co |

Alternate Birth / Death

| | | |
|---|---|---|
| Birth | 03 Dec 1870 | Lineville, Mercer Co., MO |
| Death | 09 Aug 1951 | Del Norte, Rio Grande Co., CO |

Relationships

| | |
|---|---|
| Spouse: | Dora Jane Grisamore |
| Father: | Henry Harrision Jefferson |
| Mother | Mary Elizabeth Thomas |

Alternate Relationships

| | |
|---|---|
| Spouse | DoraJane Grisamore |
| Father | Henry Jefferson |
| Mother | |

Sources:

| | | |
|---|---|---|
| AWT | ejeffers | 1012 |
| | a14243 | 19571 |
| | 2684682 | 14387 |
| 1880 | 1 | |

Family Trees has 3 matches for:
John Jefferson
★ What is the meaning of this name?

| Name | Birth Date | Birthplace | Father(F)/Mother(M) | Spouse(s) |
|---|---|---|---|---|
| Jefferson, John William | 3 DEC 1870 | Lineville Ia. Mercer County Mo. | F: Henry Harrison Jefferson<br>M: Mary Elizabrth Thomas | S: DoraJane Grisamore |
| Jefferson, John William | 3 DEC 1870 | Lineville, Mercer Co., MO | F: Henry Harrison Jefferson<br>M: Mary Elizabeth Thomas | S: Dora Jane Grisamore |
| Jefferson, John William | 3 DEC 1870 | Lineville,Mercer Co.,MO | F: Henry Harrison Jefferson<br>M: Mary Elizabeth Thomas | S: Dora Jane Grisamore |

| NodeID | DB | ID | Name | Birth | Birth Place | Death | Death Place |
|---|---|---|---|---|---|---|---|
| 1 | ejeffer | 1012 | John William Jefferson | 03 Dec 1870 | Lineville Ia. Mercer County Mo. | 09 Aug 1951 | Cannon City Fremont County Co. |
| 2 | a14243 | 19571 | John William Jefferson | 03 Dec 1870 | Lineville, Mercer Co., MO | 09 Aug 1951 | Del Norte, Rio Grande Co., CO |
| 3 | 2684682 | 14387 | John William Jefferson | 03 Dec 1870 | Lineville, Mercer Co., MO | 09 Aug 1951 | Del Norte, Rio Grande Co., CO |
| 4 | ejeffer | 1083 | DoraJane Grisamore | 11 APR 1875 | Lineville Ia. Mercer County Mo. | 04 Feb 1946 | Cannon City Fremont County Co. |
| 5 | a14243 | 19572 | Dora Jane Grisamore | 11 APR 1875 | Lineville, Mercer Co., MO | 04 Feb 1946 | Canon City, Pueblo Co. CO |
| 6 | 2684682 | 14387 | Dora Jane Grisamore | 11 APR 1875 | Lineville, Mercer Co., MO | 04 Feb 1946 | Canon City, Pueblo Co, CO |
| 7 | ejeffer | 1010 | Henry Harrision Jefferson | 4 MAR 1841 | Licking Ohio | 19 Apr 1916 | Mercer County MO. |
| 8 | a14243 | 19568 | Henry Harrision Jefferson | 4 MAR 1841 | Greenfield, Licking Co., OH | 19 Apr 1916 | Mercer Co., MO |
| 9 | 2684682 | 14383 | Henry Harrision Jefferson | 4 MAR 1841 | Greenfield, Licking Co., OH | 19 Apr 1916 | Mercer Co., MO |
| 10 | ejeffer | 1011 | Mary Elizabeth Thomas | 27 APR 1849 | West Va | 21 Aug 1931 | Lineville Iowa |
| 11 | a14243 | 19567 | Mary Elizabeth Thomas | 27 APR 1849 | Wheeling, Monongalia Co., VA | 21 Aug 1931 | Monte Vista, Rio Grande Co., CO |
| 12 | 2684682 | 14382 | Mary Elizabeth Thomas | 27 APR 1849 | Wheeling, Monongalia Co., VA | 21 Aug 1931 | Monte Vista, Rio Grande Co., CO |

310

| Link ID | DB 1 | ID 1 | DB 2 | ID 2 | Relation |
|---|---|---|---|---|---|
| 1 | ejeffer | 1012 | ejeffer | 1083 | S |
| 2 | a14243 | 19571 | a14243 | 19572 | S |
| 3 | 2684682 | 14387 | 2684682 | 14387 | S |
| 4 | ejeffer | 1012 | ejeffer | 1010 | F |
| 5 | a14243 | 19571 | a14243 | 19568 | F |
| 6 | 2684682 | 14387 | 2684682 | 14383 | F |
| 7 | ejeffer | 1012 | ejeffer | 1011 | M |
| 8 | a14243 | 19571 | a14243 | 19567 | M |
| 9 | 2684682 | 14387 | 2684682 | 14382 | M |

312

| Surname Index | |
|---|---|
| Surname | Count |
| Jefferson | 6 |
| Grisamore | 3 |
| Thomas | 3 |

1880 U.S. Federal Census record for:
John JEFFERSON

« Search results

Personal Information

| | |
|---|---|
| Name: | John JEFFERSON |
| Age: | 9 |
| Estimated birth year: | <1871> |
| Birthplace: | Missouri |
| Relation: | Son |
| Home in 1880: | Sommerset, Mercer, Missouri |
| Occupation: | |
| Marital status: | Single |
| Race: | White |
| Gender: | Male |
| Head of household: | Henry JEFFERSON |
| Father's birthplace: | OH |
| Mother's birthplace: | --- |
| Cannot read/write: | View image |
| Blind: | View image |
| Deaf and dumb: | View image |
| Otherwise disabled: | View image |
| Idiotic or insane?: | View image |

324 — Individual Nodes

| NodeID | DB | ID | Name | Birth | Birth Place | Death | Death Place |
|---|---|---|---|---|---|---|---|
| 1 | 1880 | 1 | John Jefferson | 1871 | Missouri | 09 Aug 1951 | Cannon City Fremont County Co. |
| 2 | 1880 | 2 | Henry Jefferson | 1842 | Ohio | 09 Aug 1951 | Del Norte, Rio Grande Co., CO |

326 — Individual Links

| Link ID | DB 1 | ID 1 | DB 2 | ID 2 | Relation |
|---|---|---|---|---|---|
| 1 | 1880 | 1 | 1880 | 2 | F |

Individual Nodes

| NodeID | DB | ID | Name | Birth | Birth Place | Death | Death Place |
|---|---|---|---|---|---|---|---|
| 1 | ejeffer | 1012 | John William Jefferson | 03 Dec 1870 | Lineville Ia. Mercer County Mo. | 09 Aug 1951 | Cannon City Fremont County Co. |
| 2 | a14243 | 19571 | John William Jefferson | 03 Dec 1870 | Lineville, Mercer Co., MO | 09 Aug 1951 | Del Norte, Rio Grande Co., CO |
| 3 | 2684682 | 14387 | John William Jefferson | 03 Dec 1870 | Lineville, Mercer Co., MO | 09 Aug 1951 | Del Norte, Rio Grande Co., CO |
| 4 | ejeffer | 1083 | DoraJane Grisamore | 11 APR 1875 | Lineville Ia. Mercer County Mo. | 04 Feb 1946 | Cannon City Fremont County Co. |
| 5 | a14243 | 19572 | Dora Jane Grisamore | 11 APR 1875 | Lineville, Mercer Co., MO | 04 Feb 1946 | Canon City, Pueblo Co, CO |
| 6 | 2684682 | 14387 | Dora Jane Grisamore | 11 APR 1875 | Lineville, Mercer Co., MO | 04 Feb 1946 | Canon City, Pueblo Co, CO |
| 7 | ejeffer | 1010 | Henry Harrision Jefferson | 4 MAR 1841 | Licking Ohio | 19 Apr 1916 | Mercer County MO. |
| 8 | a14243 | 19568 | Henry Harrision Jefferson | 4 MAR 1841 | Greenfield, Licking Co., OH | 19 Apr 1916 | Mercer Co., MO |
| 9 | 2684682 | 14383 | Henry Harrision Jefferson | 4 MAR 1841 | Greenfield, Licking Co., OH | 19 Apr 1916 | Mercer Co., MO |
| 10 | ejeffer | 1011 | Mary Elizabeth Thomas | 27 APR 1849 | West Va | 21 Aug 1931 | Lineville Iowa |
| 11 | a14243 | 19567 | Mary Elizabeth Thomas | 27 APR 1849 | Wheeling, Monongalia Co., VA | 21 Aug 1931 | Monte Vista, Rio Grande Co., CO |
| 12 | 2684682 | 14382 | Mary Elizabeth Thomas | 27 APR 1849 | Wheeling, Monongalia Co., VA | 21 Aug 1931 | Monte Vista, Rio Grande Co., CO |

324

Individual Nodes

| NodeID | DB | ID | Name | Birth | Birth Place | Death | Death Place |
|---|---|---|---|---|---|---|---|
| 1 | 1880 | 1 | John Jefferson | 1871 | Missouri | 09 Aug 1951 | Cannon City Fremont County Co. |
| 2 | 1880 | 2 | Henry Jefferson | 1842 | Ohio | 09 Aug 1951 | Del Norte, Rio Grande Co., CO |

350

Same As Nodes - Correlated Individuals

| Corr ID | DB 1 | ID 1 | DB 2 | ID 2 | Score |
|---|---|---|---|---|---|
| 1 | ejeffer | 1012 | a14243 | 19571 | 1.0 |
| 2 | ejeffer | 1012 | 2684682 | 14387 | 0.8 |
| 3 | a14243 | 19571 | 2684682 | 14387 | 1.0 |
| 4 | ejeffer | 1012 | 1880 | 1 | 0.7 |
| 5 | a14243 | 19571 | 1880 | 1 | 0.6 |
| 6 | 2684682 | 14387 | 1880 | 1 | 0.8 |

FIG. 3K

350 — Correlated Individuals

| Corr ID | DB 1 | ID 1 | DB 2 | ID 2 | Score |
|---|---|---|---|---|---|
| 1 | ejeffer | I1012 | a14243 | I9571 | 97 |
| 2 | ejeffer | I1012 | 2684682 | I4387 | 97 |
| 3 | a14243 | I9571 | 2684682 | I4387 | 100 |
| 4 | ejeffer | I1012 | 1880 | 1 | 75 |
| 5 | a14243 | I9571 | 1880 | 1 | 75 |
| 6 | 2684682 | I4387 | 1880 | 1 | 75 |

380 — Persons

| Person ID | Sources |
|---|---|
| 1 | ejeffers-I1012, a14243-I9571, 2684682-I4387, 1880-1 |

382 — John William Jefferson

AKA: John Jefferson

Birth / Death
| | | |
|---|---|---|
| Birth | 03 Dec 1870 | Lineville Ia. Mercer County Mo. |
| Death | 09 Aug 1951 | Cannon City Fremont County Co |

Alternate Birth / Death
| | | |
|---|---|---|
| Birth | 03 Dec 1870 | Lineville, Mercer Co., MO |
| Death | 09 Aug 1951 | Del Norte, Rio Grande Co., CO |

Relationships
| | |
|---|---|
| Spouse: | Dora Jane Grisamore |
| Father: | Henry Harrision Jefferson |
| Mother | Mary Elizabeth Thomas |

Alternate Relationships
| | |
|---|---|
| Spouse | DoraJane Grisamore |
| Father | Henry Jefferson |
| Mother | |

Sources:
| | | |
|---|---|---|
| AWT | ejeffers | I1012 |
| | a14243 | I9571 |
| | 2684682 | I4387 |
| 1880 | 1 | |

FIG. 3Q

Ancestry.com — The largest collection of family history records on the web

| Home | My Ancestry | Search Records | Family Trees | Message Boards | Learning Center | Shop |

You are here: Trees > One World Tree > Ruth Pabodie

Ruth Pabodie

Name Ruth Pabodie
🔺 Born 27 Jun 1658
Duxbury, Plymouth, MA, USA
🔺 Died 27 Aug 1740
Duxbury, Plymouth, MA, USA
(details) — 422

Family Information (details) — 426
Spouse 1
Benjamin Bartlett
Married
[day? month?] 1676
Duxbury, Plymouth Massachusetts,

Children
1. Ruth Bartlett
2. Rebecca Bartlett
3. Ruth Bartlett
4. Rebecca Bartlett
5. Deborah Bartlett
6. Benjamin Bartlett
7. Deborah Bartlett
8. Ruth Bartlett
9. Rebecca Bartlett
10. Deborah Bartlett
11. Benjamin Bartlett
12. Benjamin Bartlett
13. Robert Bartlett
14. Priscilla Bartlett
15. Abigail Bartlett
16. William Bartlett Parents — Grandparents — Great Grandparents 🔺 William Pabodie — 408

🔺 Elizabeth Alden
  🔺 John Alden
  🔺 Priscilla Mullins
    🔺 William Mullins
    🔺 Alice

Legend
🔺 = Alternate choices available
◉ = Alternate choice selected
☐ = No information specified

Page Tools
🖶 Save to My Ancestry

More Information About Ruth Pabodie
📄 Source Records (Records used to build this tree)
User-submitted Trees for Ruth Pabodie (3)

📄 Possible Source Records (Records that might reference this person)
Revolutionary War Officers
1810 U.S. Federal Census Records
Early New England Immigrants (1700-1800)

👁 See Also...
Read newspapers from this person's day  Birth year  Death year
Find the origin and meaning of the name Ruth Pabodie
See where the Pabodie's lived in 1920
About One World Tree — 406

FIG. 4A

Ancestry.com
The largest collection of family history records on the web

| Home | My Ancestry | Search Records | Family Trees | Message Boards | Learning Center | Shop |

Choose an alternative father for Ruth Pabodie

Based on current data, Ancestry's One World Tree has marked the information below with an asterisk (*) to indicate the most likely father for Ruth Pabodie. We will continue to update this information as we find more information about Ruth Pabodie.

If you are certain of a name in the list, click its Select button> to indicate your choice. If you are not certain of any of the choices, leave the "Use the most likely alternative" option selected, and One World Tree will update the information as it finds more data.

Note: The parent or grandparent that you select may change the other persons in the corresponding line for that parent or grandparent.

[Done] — 418

Parent Information

| | Father | Grandfather | Grandmother | Spouse(s) |
|---|---|---|---|---|
| 414 — [Select] | *William Pabodie<br>B: [day] [month] 1620, Saint Albans, Herts, England<br>D: 13 Dec 1707 Little Compton, Newport, RI, USA | B: [date] [location]<br>D: [date] [location] | B: [date] [location]<br>D: [date] [location] | Elizabeth Alden<br>Elizabeth Alden |
| 416 — [Select] | William Pabodie<br>B: [day] [month] 1620 St Albans, Hertford, Engl.<br>D: 13 Dec 1707 Little Compton, Newport, RI, USA | | | Elizabeth Alden |
| [Select] | William Peabody<br>B: [day] [month] 1620, St Albans, Hertford, England<br>D: 13 Dec 1707 Little Compton, Newport, RI, USA | John Peabody<br>B: [day] [month] 1589 St Albans, Hertford, England<br>D: [day] [month] 1666 Bridgewater, Plymouth, MA, USA | Isabell Harper<br>B: [day] [month] 1592 St Albans, Hertford, England,<br>D: [day] [month] 1664 Plymouth, Plymouth, MA, USA | Elizabeth Alden |

412

Selected » Use the most likely alternative.

* Most likely alternative

[Done]

Ancestry.com
The largest collection of family history records on the Web

| Home | My Ancestry | Search Records | Family Trees | Message Boards | Learning Center | Shop |

You are here: Trees > One World Tree > Ruth Pabodie > Birth Information

Select birth information for Ruth Pabodie

420

The asterisk (*) near an alternative indicates the most likely choice based on all current data. This can change as more data becomes available to Ancestry.com One World Tree.

If you are certain of an alternative in the list, click its Select button: to indicate your choice. If you are not certain of any of the choices, leave the "Use the most likely alternative" option selected, and One World Tree will update the information as it finds more data.

Done

Birth Information

| | Birth Date | Birth Place | Records |
|---|---|---|---|
| Select | * 27 Jun 1658 | Duxbury, Plymouth, MA, USA | 1 |
| Select | 27 Jun 1658 | Duxbury, Plymouth Massachusetts, , | 1 |

Selected » Use the most likely alternative.

* Most likely alternative

Done

| Home | My Ancestry | Search Records | Family Trees | Message Boards | Learning Center | Shop |

*Ancestry.com* The largest collection of family history records on the Web

You are here: Trees > One World Tree > Ruth Pabodie > Detailed Information

View detailed information for Ruth Pabodie

You can view and choose alternate information, if there is any, by clicking on the View alternate name/birth/death information icons [🔍] by each section title below.

Name Information

| Name | | Source Records |
|---|---|---|
| Ruth Pabodie | | User-submitted Trees (1) |

Birth Information  (View alternate death information)

| Birth Date | Birth Place | Source Records |
|---|---|---|
| 🔍 27 Jun 1658 | Duxbury, Plymouth, MA, USA | User-submitted Trees (1) |

Birth Information  (View alternate death information)

| Death Date | Death Place | Source Records |
|---|---|---|
| 🔍 27 Aug 1740 | Duxbury, Plymouth, MA, USA | User-submitted Trees (1) |

FIG. 4D

CORRELATING GENEALOGY RECORDS SYSTEMS AND METHODS

CROSS-REFERENCES TO RELATED APPLICATIONS

This application is related to co-pending, commonly assigned and concurrently filed U.S. patent application Ser. No. 10/748,441, entitled, "GENEALOGY INVESTIGATION AND DOCUMENTATION SYSTEMS AND METHODS", by Bennett Cookson, Jr., et al., and to co-pending, commonly assigned and concurrently filed U.S. patent application Ser. No. 10/748,442, entitled, "PROVIDING ALTERNATIVES WITHIN A FAMILY TREE SYSTEMS AND METHODS", by Bennett Cookson, Jr., et al., the entire disclosure of each of which is herein incorporated by reference for all purposes.

BACKGROUND OF THE INVENTION

The present invention relates generally to genealogy and more particularly to computer-based genealogy investigation tools.

Genealogy is an enjoyable hobby to some and an important life's work to many. Whether for cultural, religious, recreational or other reasons, many people wish to trace their ancestry.

The process of genealogy investigation has evolved considerably over the years. In the past, the practice involved keeping notes in family bibles handed down through the generations, and many continue to do this today. Not very long ago, the process often required traveling to the hometowns of ancestors to pore over public records, newspapers, and the like at courthouses, libraries, and such. Once found, family information was written into journals and notebooks or onto index cards. Because of the geometric expansion of information with each generation, analyzing the information became a daunting task. The advent of computers, however, has created significant opportunities for improving and simplifying the process.

Many public records are now accessible using a computer and the Internet, thus allowing investigators to search electronically using keywords and such without having to travel to where the original records are kept. Additionally, several public and private efforts to collect and catalog genealogy data have resulted in publicly accessible databases with much of the work already complete. Further still, some companies have produced commercial web sites where individuals can cooperate to extend a common family tree. Some examples of each include: <www.archives.gov>, the US National Archives and Record Administration website; <www.familysearch.org>, the LDS Church Family Search website; <www.ancestry.com>, the Ancestry.com website, which includes the Ancestry World Tree; <www.genealogy.com>, the Genealogy.com website, which (includes the World Family Tree); <www.ellisisland.org>, which includes immigration records; <www.interment.net>, which includes Cemeteries and Cemetery Records; <www.rootsweb.com>, which includes World Connect; <www.onegreatfamily.com>, the One Great Family website; <www.MyTrees.com>; and <www.GenCircles.com>. In fact, the process has become so popular that a standard data format has evolved.

GEDCOM (Genealogical Data Communication) is an industry standard data format for genealogical information. It uses a standard ASCII file format in which each line contains one data element. [A complete description of the GEDCOM file format is available at <www.gendex.com/gedcom55/55gcint.htm>, the content of which is entirely incorporated herein by reference for all purposes.] Many genealogy investigation services now collect and distribute data using the GEDCOM standard.

Despite the technological advances—or in some cases because of the technological advances—relating to genealogy, the activity remains ripe for improvement. One significant limitation that exists in many "open" genealogy investigation tools (i.e., those that allow independent users to submit data), is a bias in favor of the information submitted by the most recent submitter. Because of the way data is related within these systems, data conflicts are difficult to resolve. The problem is rectified by allowing the latest submitter to overwrite conflicting data submitted by a previous user. This is but one example of the many limitations of presently-available genealogy investigation tools. Embodiments of the present invention address these and many other limitations.

BRIEF SUMMARY OF THE INVENTION

Embodiments of the invention thus provide a method of consolidating genealogy records. The method includes partitioning the records using at least one index file to form one or more partitions, sorting the records in a partition based on a data element in the records, comparing records within a sort range, based on the comparison, identifying same person records, consolidating information in the same person records, receiving a request from a user to view at least a portion of the consolidated information for a particular group of same person records, and sending a file that includes the portion to the user.

In some embodiments partitioning the records using at least one index file includes using a surname index to identify records having the same surnames and grouping those records into a surname partition. The method may include using the surname index to identify records having similar surnames and grouping those records into the surname partition. The method may include using a phonetic algorithm to identify records having similar surnames. The phonetic algorithm may include double metaphone and/or SOUNDEX. Sorting the records in a partition based on a data element in the records may include sorting the records based on birth date. Sorting also may be based on name, death data, death place, and/or birth place. Comparing records within a sort range may include comparing records within a birth date range. Identifying same person records may include calculating a score that represents the likelihood that a pair of compared records represent the same person. The method may include comparing records related to pairs of same person records. Comparing records related to pairs of same person records may include revising the score based on the comparison of related records. Identifying same person records may include comparing the score to a predetermined threshold and rejecting records as "same person" records if the score is below the threshold. The portion may include a family tree based on consolidated information from a plurality of records.

In other embodiments the present invention provides a system for consolidating genealogy records. The system includes a processor programmed to partition the records using at least one index file to form one or more partitions, sort the records in a partition based on a data element in the records, compare records within a sort range, based on the comparison, identify same person records, consolidate information in the same person records, receive a request from a user to view at least a portion of the consolidated information for a particular group of same person records, and send a file that includes the portion to the user.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2C illustrates an exemplary consolidated person page according to embodiments of the invention.

FIGS. 4A-4D illustrate a series of display screens that a user may encounter when using an embodiment of a system according to the present invention.

DETAILED DESCRIPTION OF THE INVENTION

Figure 1:
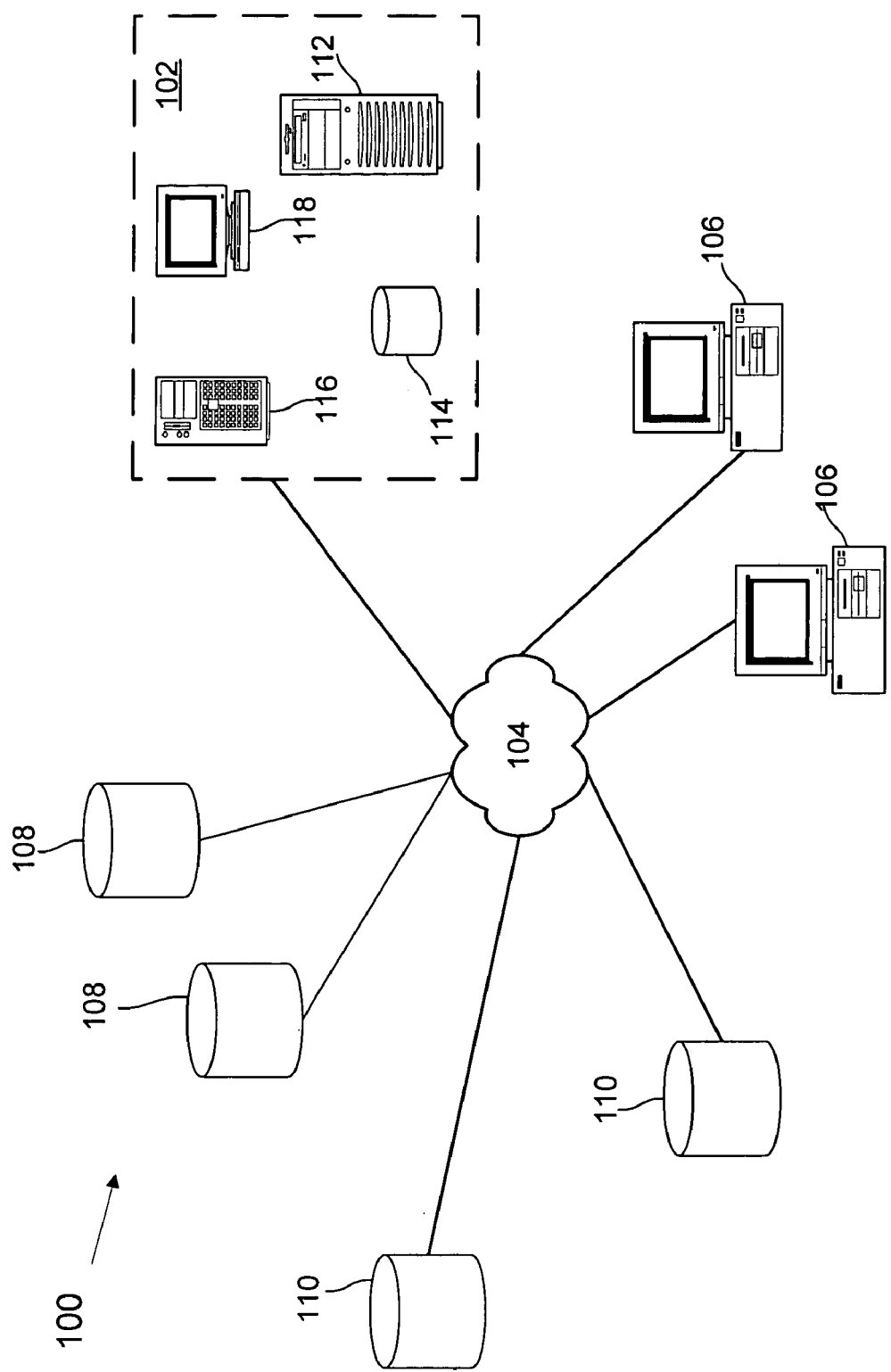
FIG. 1 illustrates a genealogy investigation and documentation system according to embodiments of the invention.

Embodiments of the present invention provide systems and methods for genealogy investigation. In some embodiments, the present invention comprises systems and methods for receiving data from any combination of a number of sources and storing the data as records in various standardized and/or proprietary formats. Records may correspond to persons, either living or deceased, information about the persons, and relationships among them. In some embodiments, the records are used to produce family trees, either in response to a request from a user or continuously as new data is received. Thus, embodiments of the present invention provide systems and methods for taking data identifying a specific individual from any source and in any format, converting it into a common format (a persona), identifying what parts of that data may define relationships with other persons on which data is available, and processing the various data elements (persona) into pedigrees, without regard to whether any of the data elements have been so combined prior to that processing, whether in GEDCOM or any other family history format.

In contrast to previously-known "open" family tree systems, embodiments of the invention described herein treat new information merely as additional data. This is the case whether the data comes from random users or from highly reliable records systems. No information is categorically deemed "correct" and thus does not "overwrite" data provided by others. Many previously-known systems sufferer from a bias in favor of the most recently submitted data, resulting in confusion when two data sources disagree. Those skilled in the art will appreciate this problem by realizing how different users with access to the same open system may alternatively and continuously overwrite each other's entries, especially if they disagree on some aspect of a family tree or a person.

Also in contrast to previously-known systems, embodiments of the invention described herein are "data-centric" as opposed to "tree-centric." This means that embodiments described herein collect information and store the information as data records that represent tree elements (e.g., nodes and relationships). The elements, however, are not conclusively linked together and the information therein is not deemed correct, but instead the information is used to infer relationships and attributes when the likeliness exceeds a threshold. As a result, new information may either strengthen, diminish, or not affect an existing inference of a relationship or information about a person. Conversely, many previously-known systems collect data using a tree structure. New information is added only by linking off of existing trees or starting a new tree. The tree structure is the essence of the data gathering process. If a user adds new information by creating a seemingly incorrect relationship, the situation is corrected only by dissolving the relationship. Once the relationship is dissolved by a subsequent user, the previous user's interpretation of information that lead to the perceived existence of the relationship is gone.

As used herein, the term "tree" or "family tree" will refer to a hierarchical structure that links generations in parent-child relationships. It should be understood that a tree may be as simple as one parent and one child or as complex as the theoretical "single family tree" that links all individuals. Thus, any specific tree may be a part of another tree; the two may overlap, or one may completely include the other.

Trees are made up of nodes and relationships. Nodes represent persons, either living or dead. Relationships exist between nodes and represent real life relationships between the persons represented by the nodes. Relationships include mother, father, child, spouse, sibling, self or same as, and the like.

As used herein, "persona" will be understood to mean an instance of a person and a "persona record" is a data record of information from a single source that describes the person. Many different persona records may represent any given persona.

A persona may have one or more "assertions," which are presumptive truths about the persona. An assertion (or "inference") may be an event such as birth, death, draft registration, and the like. An assertion also may be an attribute such as name, occupation, race, hair color, fingerprint, DNA, and the like. An assertion may become such because an individual believes it to be true. As will be described, however, an individual or the system described herein may generate an assertion based on a review of other information. For example, based on a comparison between records, an inference of a relationship or an attribute may result. Assertions, however, may be rejected by users and/or may be overcome by new information.

"Primary source" or "primary source data" refers to a source of non-compiled genealogy information or the data therefrom. For example, a census database is a primary source, as is a news paper.

Having described embodiments of the invention generally, attention is directed to FIG. 1, which illustrates an exemplary system 100 according to embodiments of the invention. The system includes a host computing system 102 and a network 104 through which the host computing system communicates with user computers 106, tree databases 108, and records databases 110. The host computing system 102 may include a processing system 112, a storage system 114, a web server 116, administrative computers 118, and the like. The host computer system 102 includes software that programs it to perform the methods described herein.

The various elements than make up the host computing system 102 may be co-located at a single facility or distributed across a geographic area. The processing system 112 of the host computing system 102 may be any suitable computing device, or combination of devices, that are programmable to carry out the functions of embodiments of the present invention. Examples include mainframe computers, workstations, servers, personal computers, laptop computers, and the like. The storage system 114 may be any storage device or combination of storage devices. Examples include a server, a database, or the like, or any other type of storage arrangement, and may include magnetic, optical, solid state memory, and/or the like, or any other type of storage medium. The web server 116 may be any server capable of providing a web-like interface to a network, either internal or external. The administrative computers 118 may be any computing devices capable of providing administrative users access to the operations of the system.

The network 104 may be wired or wireless, and may include the Internet, a virtual private network, a local area network, a wide area network, and/or the like. The user computers 106 may be any computing devices capable of accessing the host computing system 102 via the network 104.

The tree databases 108 and records databases 110 may be any storage devices and/or computing systems mentioned above with respect to the host computer system. Tree databases 108 and records databases 110 also may be non-electronic primary sources. These databases may include public records databases, primary sources, commercial genealogy databases, private databases, and the like. For example, the tree and records databases may comprise any of the following: Ancestry World Tree, Social Security Death Index, World Family Tree, birth certificate, death certificate, marriage certificate, draft registration, veterans, property records, census, motor vehicle, and the like.

Those skilled in the art will appreciate that the foregoing is but one example of a system according to the present invention. Other systems are possible.

Figure 2A:
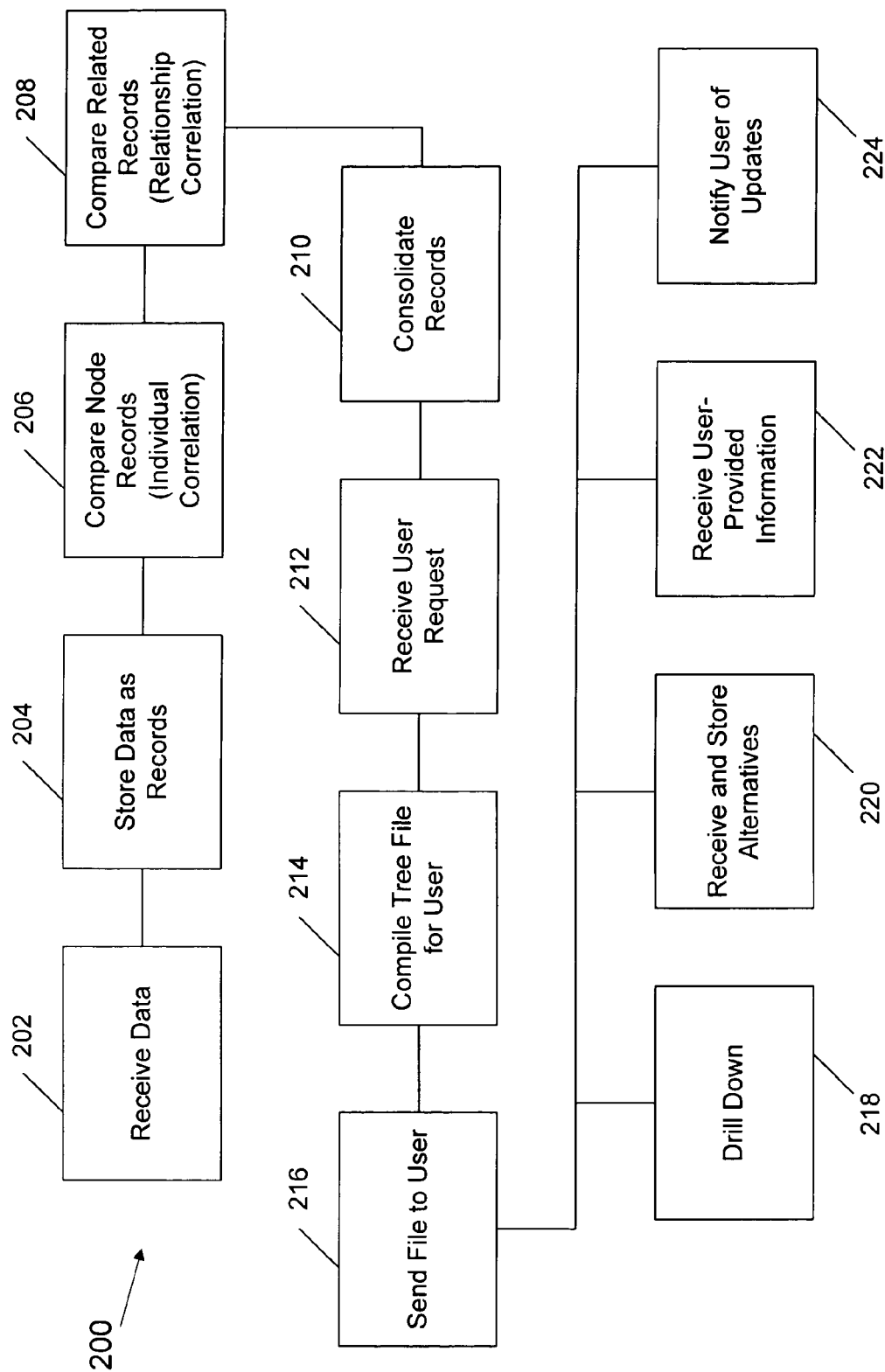
FIG. 2A illustrates a method of genealogy investigation that may be embodied in the system of FIG. 1.

Attention is directed to FIG. 2A, which illustrates a first method 200 according to embodiments of the invention. The method may be implemented in the system 100 of FIG. 1 or other suitable system. It is to be understood that the method 200 is merely exemplary of a number of equivalent methods according to embodiments of the invention all of which are within the scope of the present invention. Equivalent methods may include more, fewer or different steps than those described herein, as is apparent to those skilled in the art in light of this disclosure.

The method 200 begins at block 202 wherein a host computing system, such as the system 102 described above, receives data. The data includes assertions relating to one or more personas. Assertions may include: first, middle, and last names, name prefixes (Sir, Mr., Dr. Mrs., and the like) and/or name suffixes (Sr., Jr., III, J. D., and the like); addresses; birth dates; birth places; death dates; death places; spouse names; children names; sibling names; relationships; and the like.

Data may be received in any or a number of forms. For example, data may be in the form of a family tree or in the form of records representing individual persons. In some examples, data is received as a GEDCOM file. In other examples, data is taken from indexes of primary source records such as census and vital records. Other examples are possible, including data being received in a combination of the aforementioned forms.

Data may be received from any of a number of sources. In some examples, data is received from databases such as the Ancestry World Tree Database, the World Family Tree Database, the 1930 Mini-Tree Database, and the like. In other examples, data is received from records databases such as birth records databases, death records databases, marriage records databases, census records databases, draft card databases, and the like. In other examples, data is received from individual users as either trees or individual records. In fact, potential sources include all census records (federal, state, and local) for any country, user submitted family tree data, death indexes such as SSDI for the US or Civil Registration in the UK, newspaper obituaries, various sources and forms of vital records, the Family Data Collection, military and military pension records, and/or any database that has names, dates, places and/or relationships. Other examples are possible, including data being received from any combination of the foregoing.

At block 204, data is stored as individual records. Records may include persona records, relationship records, and the like. This process involves evaluating the data and standardizing (or normalizing) its format. Many examples of this process exist, several of which will be described in more detail hereinafter. Generally, however, each record represents data from a single source and an individual person may be represented by many different records. Thus, unlike many previously-known genealogy investigation tools, embodiments of the present invention do not necessarily assume new data to be the most accurate data and use it to overwrite existing data. In most embodiments of the invention, each time data is added, it is stored as at least one new record. In a specific example, name, birth, birth place, death, and death place are stored in a record in an "individual nodes" database, and, if the data indicates a relationship, the related names and the relationship type are stored as a record in an "individual links" database. If the data includes other information, this information is stored in an "other data" database in some embodiments.

At block 206, one or more individual node records are compared. The comparison may operate on any or all of the information in the records and may use methods know to those skilled in the art or methods that are apparent in light of this disclosure. In some cases, the comparison includes factors that account for the reliability of the source. For example, public records may be considered more reliable than user-submitted data. The comparisons also may include adjustments based on other records. For example, if a draft registration exists for an individual, a birth certificate indicating the person was born only five years prior to the registration date is likely not for the same person. Many such factors may be included. In a specific embodiment, each comparison between two individual node records results in a factor P(s) that quantifies the likelihood that the two records represent the same person. If P(s) is greater than a predetermined threshold, the two records are provisionally determined to represent the same person. This process may be referred to as "individual correlation."

Properly correlating all individual records theoretically requires comparing every individual record to every other individual record. This process, however, quickly may become an overwhelming task given the possible number of records. Thus, the process may be simplified in any of a number of ways. In a specific example, individual correlation may be simplified using, for example, a surname index to partition data into groups based on surname. The comparison process may be further simplified using, for example, a sort on first name, birth date, or other relevant data within the individual record. The partitioning process will be explained in more detail hereinafter.

Figure 2B:
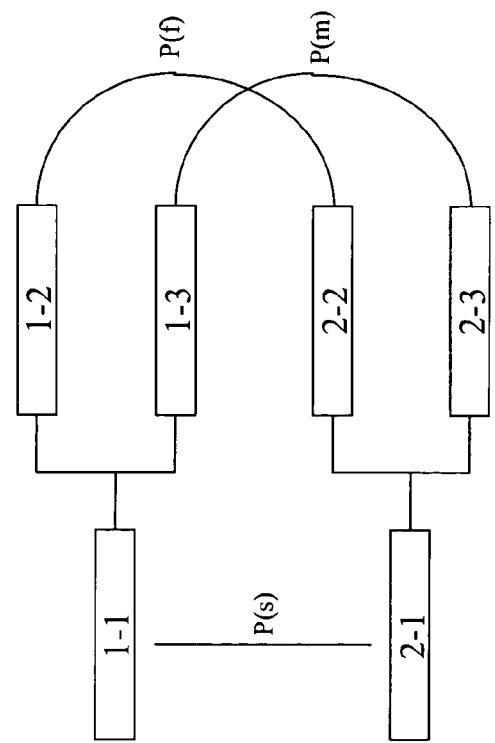
FIG. 2B illustrates one example of the process of relationship correlation in greater detail.

Following individual correlation, at block 208 those records that have been determined provisionally to represent the same person (i.e., "same as records") undergo "relationship correlation" as will be described. In a specific example, the individual links records relating to the same as records are consulted to determine whether parent relationships exist for each. If so, the respective parent records are compared to one another, if the comparison was not previously completed during individual correlation. Each comparison results in a factor, P(f) that represents a comparison of the father records, and a factor P(m) that represents a comparison of the mother records. The P(s), P(f), and P(m) factors are then collectively used in the following formula to calculate P(s|f,m) representing a revised likelihood that the two same as records relate to the same person:

$$P(s \mid f, m) = \frac{P(f)P(m)P(s)}{P(f)P(m)P(s) + P(f')P(m')P(s')}$$

Where P(s')=1−P(s); P(f')=1−P(f); and P(m')=1−P(m). If P(s|f,m) exceeds a pre-determined threshold, then the two same as records are deemed to relate to the same person. This specific example of relationship correlation is shown graphically in FIG. 2B. It is to be understood, however, that other algorithms are possible, including ones that encompass more generations or work from ancestors to descendants, rather than from descendants to ancestors.

At block 210, records are consolidated into person pages. Person pages comprise records of consolidated information about a person and may include assertions, alternative assertions, relationships, alternative relationships, sources of the information used to compile the person page, and the like. This involves consolidating all information from same as records into a single person page, and creating a single person page for unique records. One specific example of a person page 230 is illustrated in FIG. 2C.

At block 212, a request is received from a user to display a family tree. The request minimally includes a name of a person; however, in most instances, at least one additional piece of information about the person may be required. The additional piece of information may be an assertion about the person (e.g., birth, death, birthplace, death place, and the like).

At block 214, a file is constructed using the information provided in the request. The file comprises assertions about the person identified by the requester, and a family tree using the person as the root. The information is compiled by locating a person page relating to the person, then using the person page to locate other person pages related to the person. Alternative relationships also may be included. The file also may include scores relating to the likelihood that assertions and relationships are correct. The scoring process for relationships was described above; assertions may be similarly scored. At block 216, the file is sent to the user.

In some embodiments the user is given the opportunity to "drill down" to more detailed information about someone or something in the file. In response, the additional information is located and sent to the user. In some embodiments, this information is located in the original person page or a related person page. For example, the user may be able to navigate up a family tree by selecting children of the root and having a new tree generated based on the child as a root. In other embodiments, responding to the request involves selecting information from the records in the other data database. Many such examples are possible. The drill down process is shown as block 218.

In some embodiments the user is provided the option of selecting among alternatives. If provided and the user does so, the tree may be updated based on the selected alternative. In some embodiments, the user's selections are saved for the next time the user access the same tree. The iterative process of selecting and storing alternatives is shown in as block 220.

In some embodiments, the user is given the opportunity to provide information. The information may comprise one or more digital pictures, files of text (e.g., a journal of a person in the requested tree, or a note about what a user knows about the person or about the sources used to evaluate information), and the like. This information may be made available to other users. The user also may submit genealogy data. User-submitted genealogy data is received, stored, and processed as described above. The receipt of user information is shown as block 222.

The foregoing process may be repeated periodically or continuously as new data is received. In some embodiments, a records update process takes place in batch mode. In other embodiments, the process takes place each time new data is submitted. In still other embodiments, the update process is a combination of batch and continuous and may depend on the source from which the data originates.

As new data is added to the system, probability factors relating to assertions about personas and links between personas may change. Thus, a family tree originating from the same root and presented to a user on subsequent visits may be different. This may be handled in a number of ways. In one embodiment, the user is presented with the new information upon re-accessing the system. The user then may be presented with a summary of the changed inferences and given an opportunity to accept, partially accept or reject the resulting effect on the user's family tree. In other embodiments, the information shows up as an alternative selection and the user may select among the alternatives. In still other embodiments, the system generates a message, such as an email or a list of changes on a web page, that is sent to affected users when new calculations are made that affect their trees. The options then may be presented to affected users when they next access the system. Other embodiments use a combination of the foregoing. The process of notifying users regarding updates is shown as block 224.

Those skilled in the art will appreciate that the software to implement the method described above and any variation on it may be coded in most any programming language. In a specific embodiment, however, XML is used. In other embodiments, however, XML is used to represent the data, the code to correlate and consolidate is written in JAVA and C++, and the code to display the persona to the user are is written using HTML, JavaScript, and the .NET framework. Additionally, a relational database is used to manage the data at various points in the process. The code may reside on one or more computing devices that cooperate to perform the methods described above.

Figure 3A:
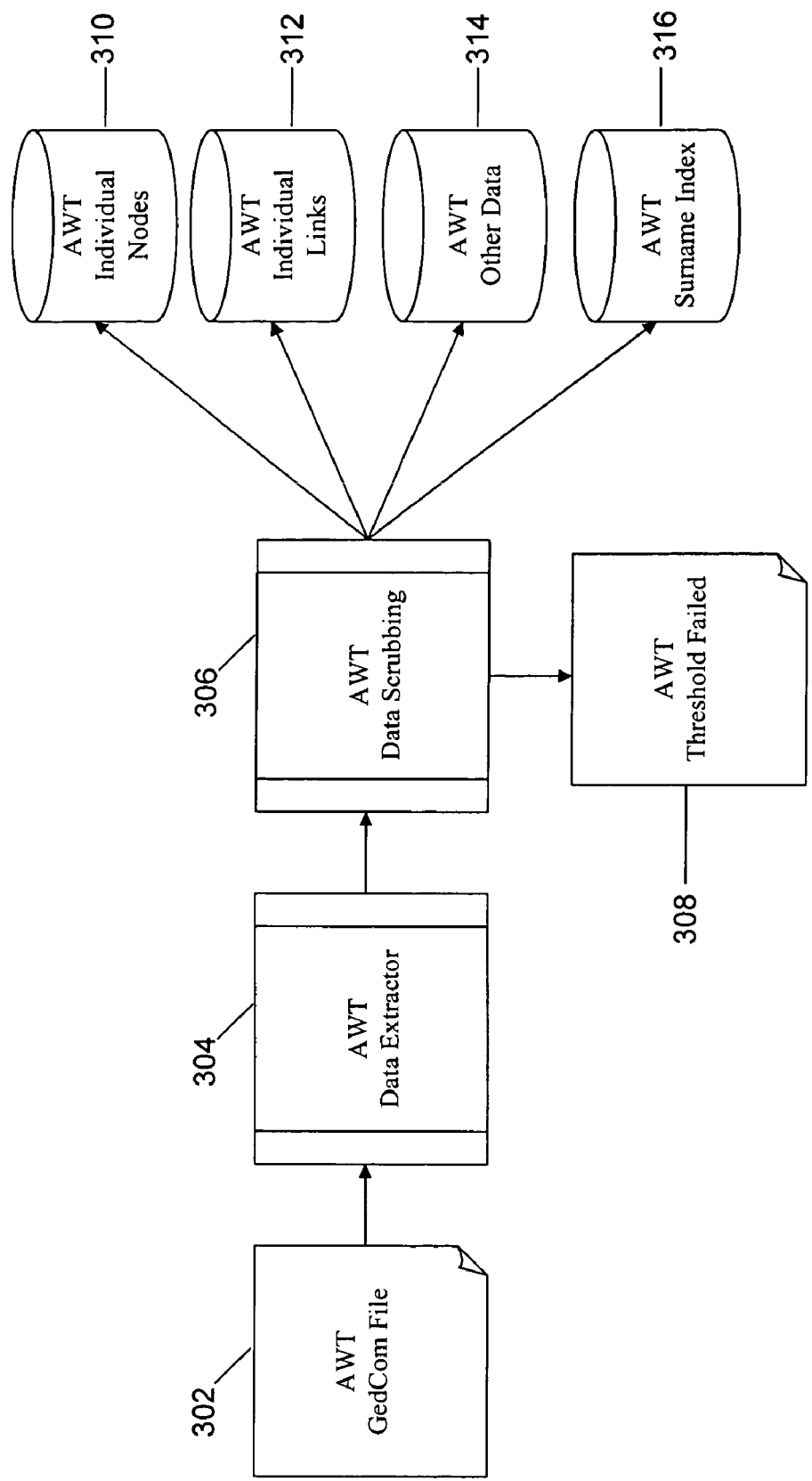
FIGS. 3A-3Q illustrate a detailed example of a record consolidation process according to an embodiment of the invention.
Figure 3B:
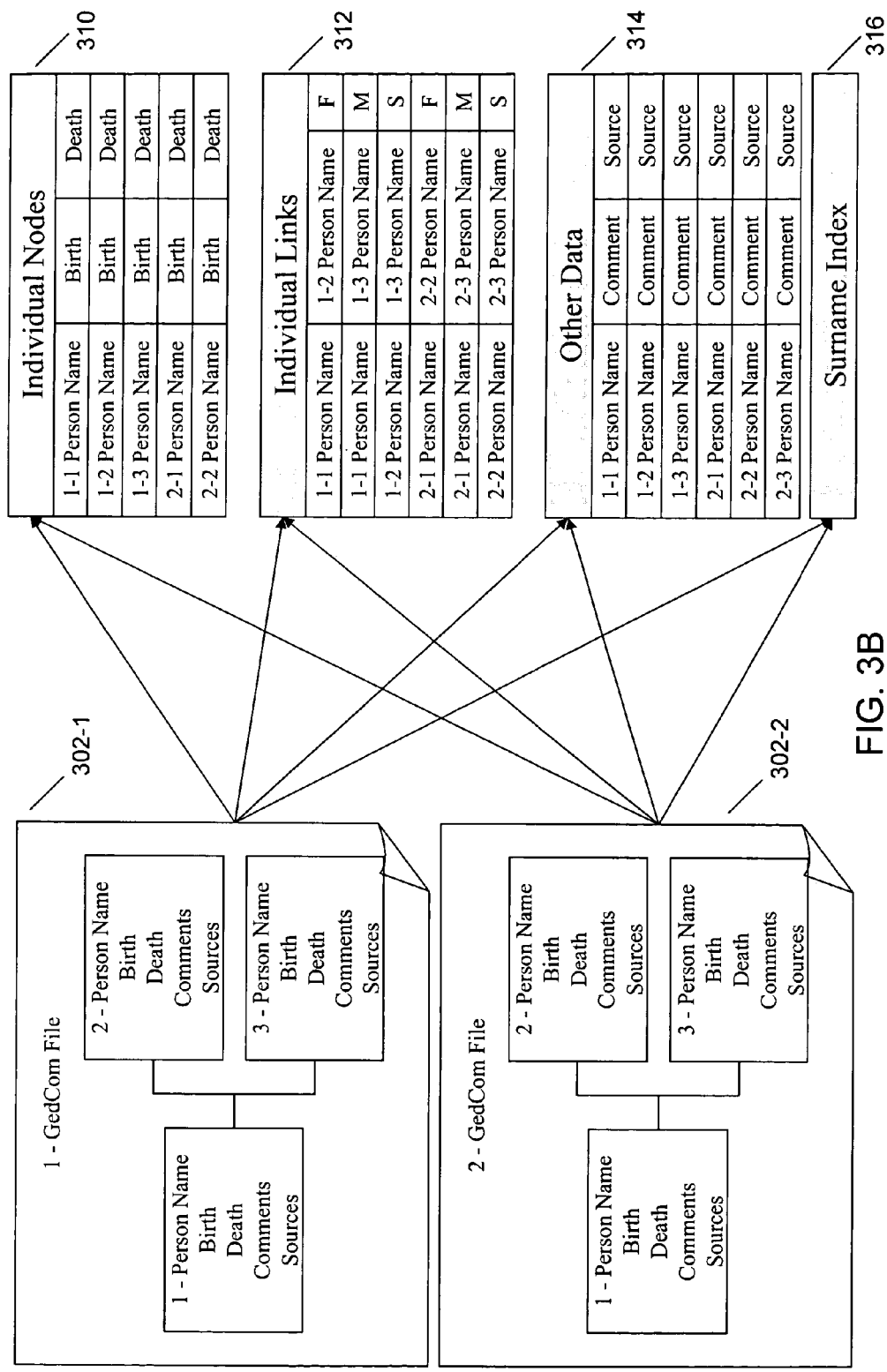

Attention is directed to FIGS. 3A-3Q, which illustrate a more specific example of the process of receiving, storing, and analyzing genealogy data. For example, FIGS. 3A and 3B depict data being received from the Ancestry World Tree database. The data exists as one or more GEDCOM files 302. The data is read using a data extractor 304, which may be specifically designed to extract data from a specific data storage environment. Through a data scrubbing process 306, the data is parsed and evaluated. This may involve assessing its completeness, accuracy, or other characteristics. Data whose utility or accuracy falls below a pre-established threshold is rejected to an AWT threshold failed file 308. The remaining data is stored in one or more records in specific databases. These include an individual nodes database 310, an individual links database 312, an other data database 314, and a surname index 316. The individual nodes database 310 stores individuals and core data (birth and death dates) as well as the source of the data. The individual links database 312 stores links between individuals and the type of link. The other data database 314 stores information not critical to the data evaluation and relationship analysis processes. The surname index 316 stores surnames and counts of surnames. Particular uses for each of the databases will be described in more detail below. FIG. 3B more clearly illustrates the placement of specific data from GEDCOM files into records in these databases.

As shown in FIG. 3B, a unique record is created in several of the databases for an individual entry from a GEDCOM file. Names, birthdates, and deathdates for each individual go into records in the individual nodes database 310. Names, comments, and sources go into records in the other data database 314. Relationships types and the related individual names go into records in the individual links database 312. Although not shown, surnames go into the surname index 316 along with a count of the number of records in which the surname exists.

FIGS. 3C and 3D illustrate a specific example of the process for extracting data from the AWT database. FIG. 3C shows three different GEDCOM files 302. At this point, no conclusions are reached regarding whether the individuals identified in the three different GEDCOM files are related. As shown in FIG. 3D, each instance of a name results in a separate record in the individual nodes database 310. Entries in the records identify the source of the data (DB) and create a unique ID for the data (ID). Other entries include name, birth, birth date, death, and death place. Of course, in other examples other data could be included in the records. Each instance of a relationship among individuals results in a record in the individual links database 312. Each record includes links that identify the source for the data (DB1, DB2), the record identifier from the individual nodes database 310, and the relationship. Each unique surname results in a record in the surname index 316, and a record in the surname index counts the number of occurrences of the surname.

Figure 3E:
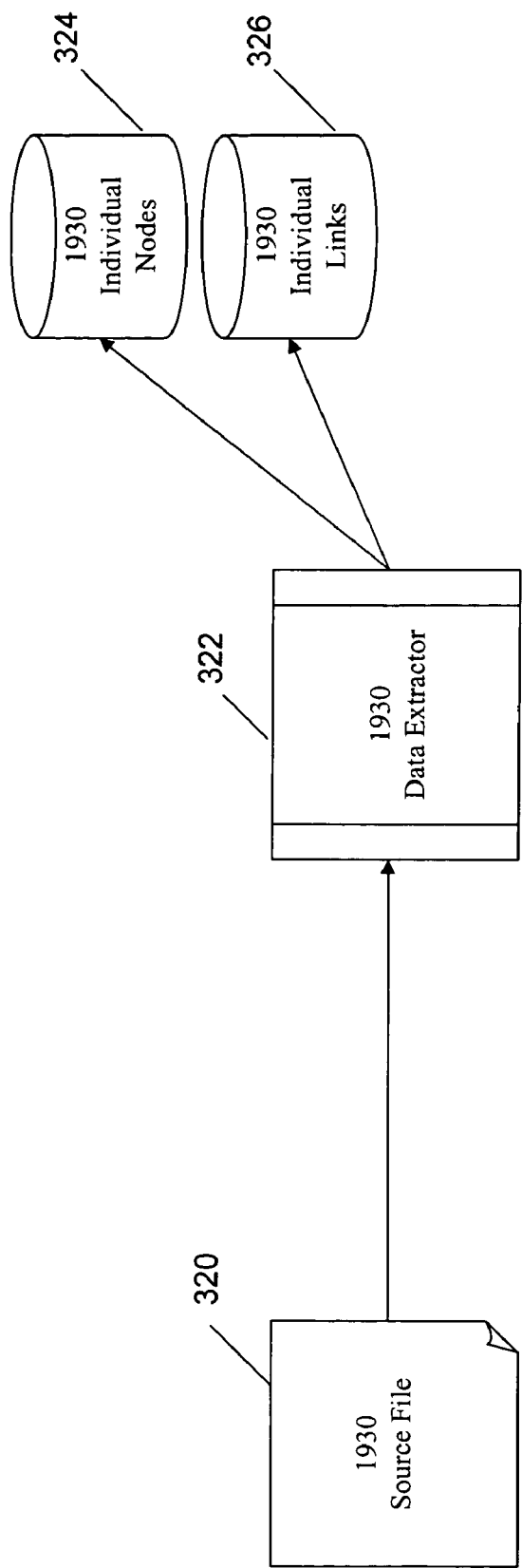

FIG. 3E illustrates a data extraction process for a census database (1930 US Federal Census). The data resides in census source files 320. The data is extracted using an extractor 322 that may be specifically designed for extracting census records. The data is then stored as records in an individual nodes database 324 relating to the census and as records in an individual links database 326, also relating to the census. Note that a data scrubbing process is not shown. It may be the case that some source data is acceptable without scrubbing. The absence of a surname index indicates that some source databases do not contribute to surname counts.

FIGS. 3F and 3G illustrate a specific example of a data extraction process from a census database (e.g., the 1880 US Federal Census). FIG. 3F illustrates data in a specific census record, and FIG. 3G illustrates the placement of the resulting data in the individual nodes database 324 and the individual links database 326.

Figure 3H:
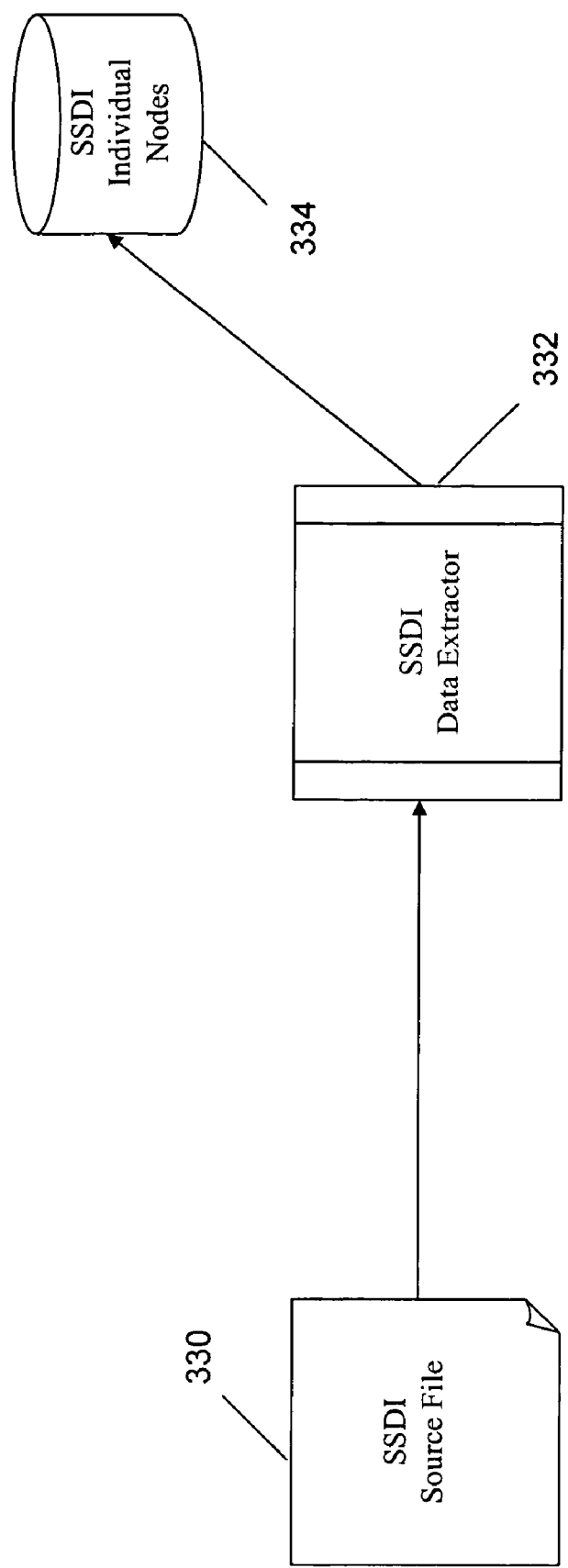
Figure 31:
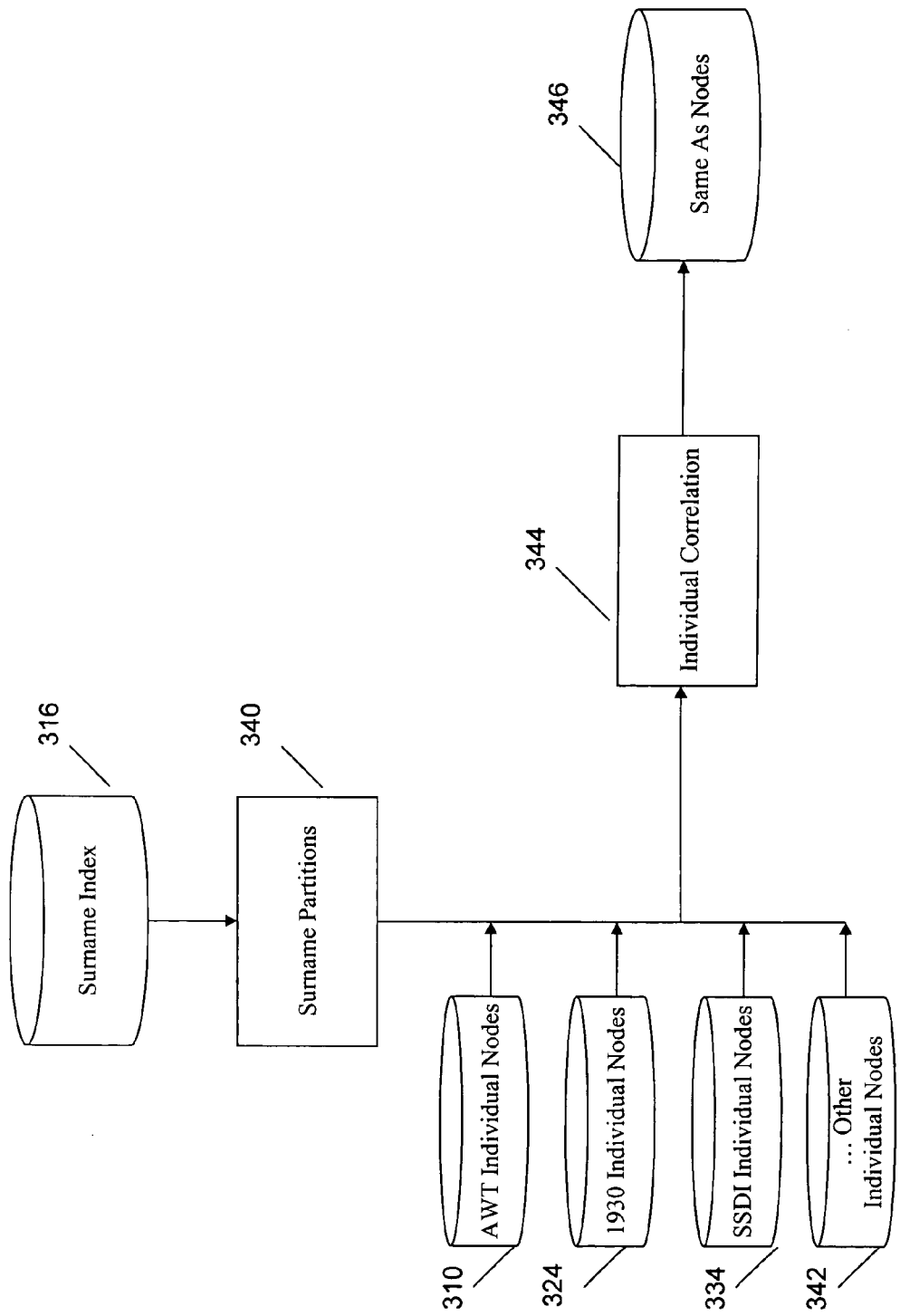

FIG. 3H illustrates a data extraction process for data from a social security death index (SSDI-Social Security Death Index) database. The data exists in individual files 330 and is extracted using an extraction process 332 that may be unique to this database. The data is then parsed and stored in an individual nodes database 334. In this example, because the source does not include relationships, no entry results into an individual links database. As was the case with the census database extraction process, no data scrubbing is used and no entries are made in a surname index.

It should be noted that the three data extraction examples just described are merely exemplary. Many other such examples are possible and apparent to those skilled in the art in light of this disclosure.

Figure 3J:
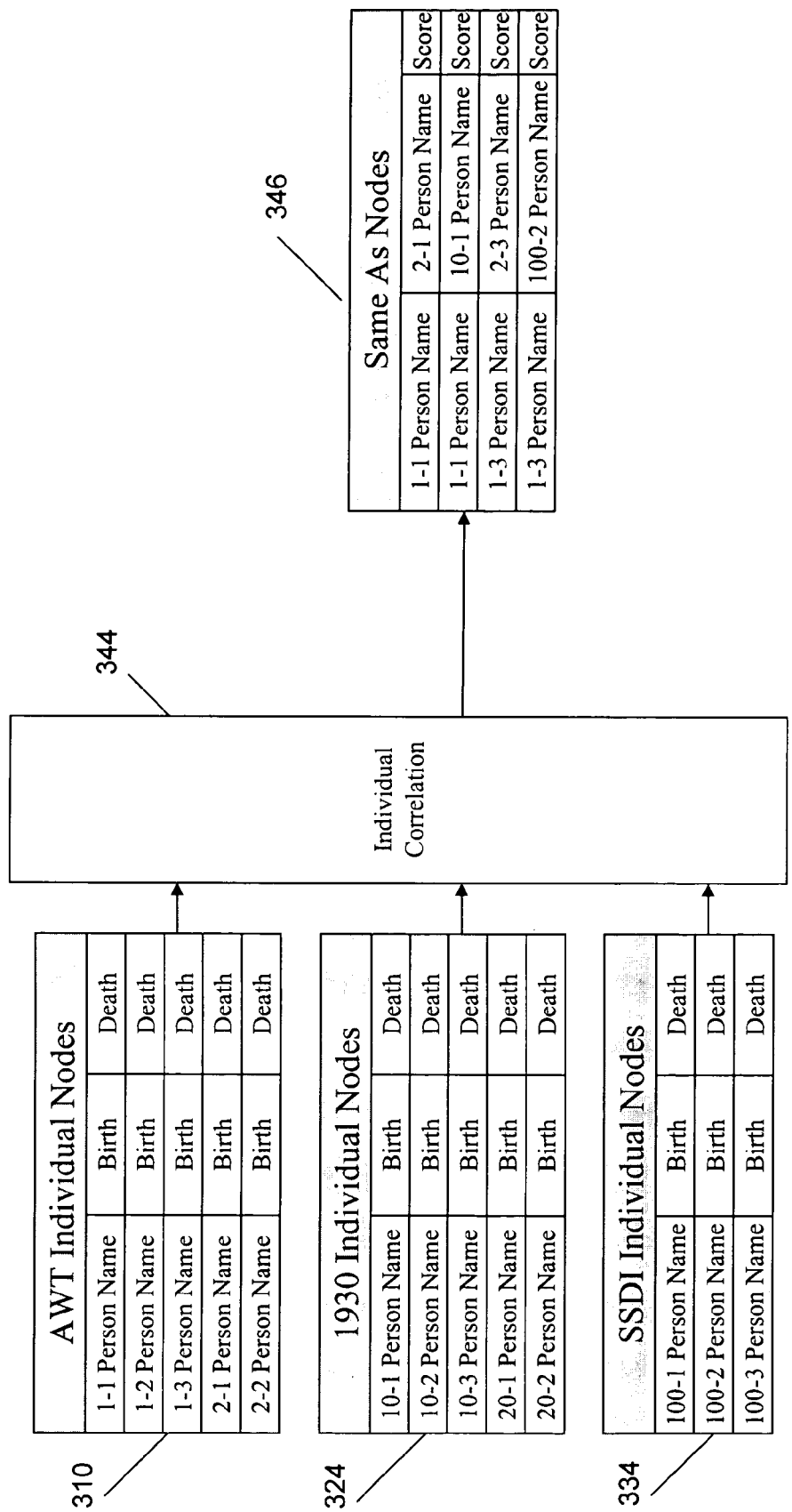

Continuing with the example, attention is directed to FIGS. 3I and 3J, which illustrate a process of correlating individual records. In this process, individual records from each of several individual nodes databases 310, 324, 334, 342 are compared to each other using an individual correlation function 344 to determine if the records relate to the same individual. Individual records whose data is identical or nearly identical when compared (i.e., individual correlation above a threshold) are stored in a same as nodes database 346 and are presumed to identify the same individual. As shown in FIG. 3J, the records in the same as nodes database 346 include the person names and record identifiers for the related records as well as a score that represents the degree to which the records are similar.

To simplify the comparison process, the individual records may be partitioned into smaller groups. In this example, the surname index 316 is used, together with a surname partition function 340 to partition data into manageable pieces. Because surnames for the same individual may be spelled slightly differently, a phonetic algorithm such as double metaphone, SOUNDEX, and/or the like may be used to keep similar names in the same partition even if they are spelled differently. The process then may be further simplified by sorting a partition on, for example, first name, birth data and/or year or other relevant data. Records within a partition and/or within ranges in the partition are compared to each other, thus significantly reducing the total number of comparisons that must be made.

The individual correlation process discussed immediately above may fail to identify records for individuals that completely changed their name. To avoid the problems this may cause, related records may undergo individual correlation after relationship correlation. Thus, two records for the same woman who changed her name at marriage may be identified once her father is identified if, for example, her first name and birth date are the same in the two records in which her last name is different.

FIG. 3K illustrates a specific example of the individual correlation process using the AWT individual nodes database 310 and the census individual nodes database 324 created earlier in the example. The comparison based on surnames results in a correlated individuals list 350. In this simplified example, the correlated individuals list 350 only includes entries based on the name "John William Jefferson." From the individual nodes database 310, a comparison of NodeID 1 to NodeID 2 results in an entry in the correlated individuals list 350 identified as Corr ID 1. The entry includes the source (DB1, DB2) and record ID (ID1, ID2) for the compared records and the score that the comparison generated. In the case of Corr ID 1, the comparison resulted in a score of 0.8. This is because the death place differs between NodeID 1 and NodeID 2 of the individual nodes database 310. A comparison between NodeID 2 and NodeID 3 from the same database, however, resulted in a score of 1.0 as can be appreciated from Corr ID 3 in the correlated individuals list 350. The remaining entries in the correlated individuals list 350 result from other entries based on the name "John William Jefferson."

Figure 3L:
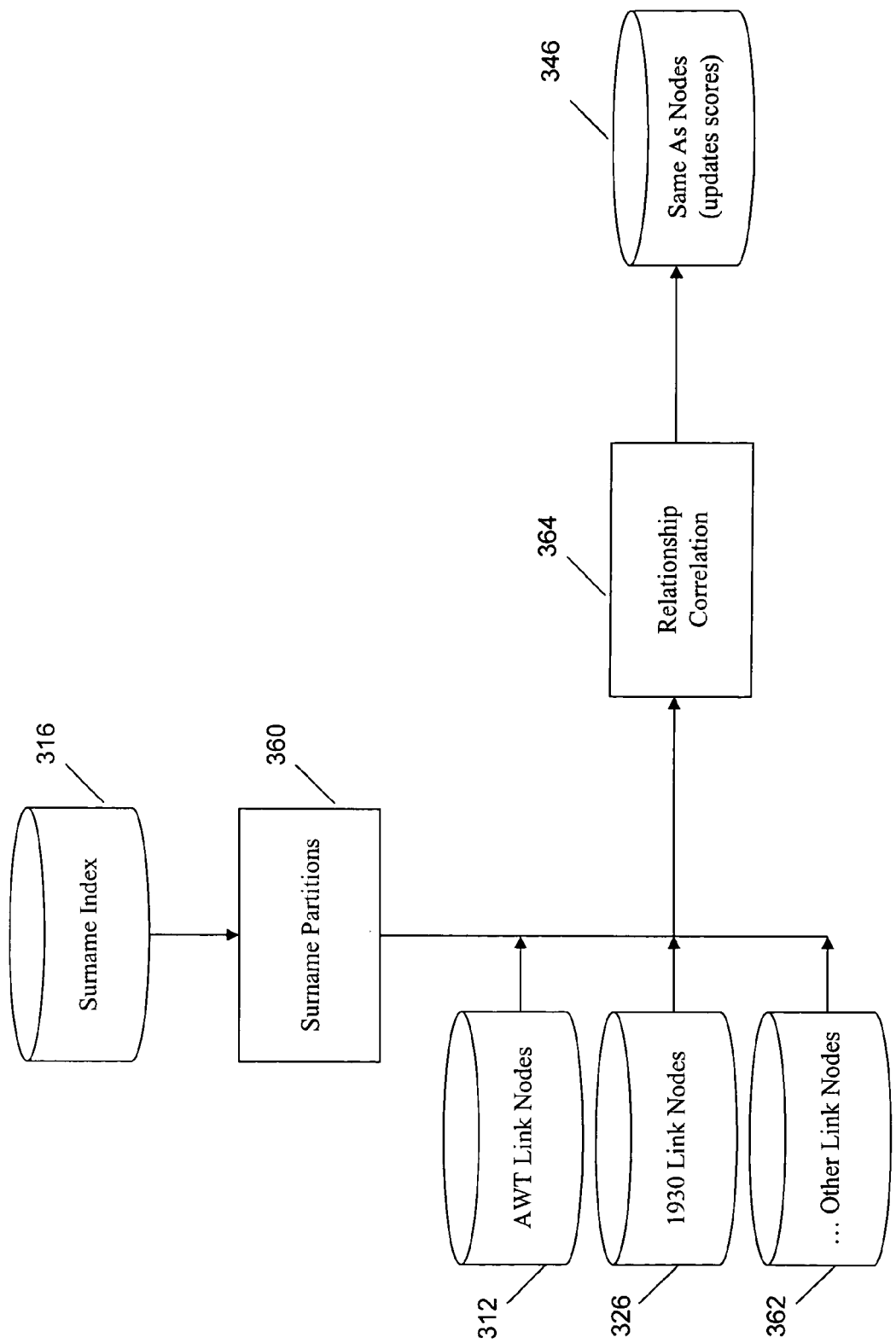
Figure 3M:
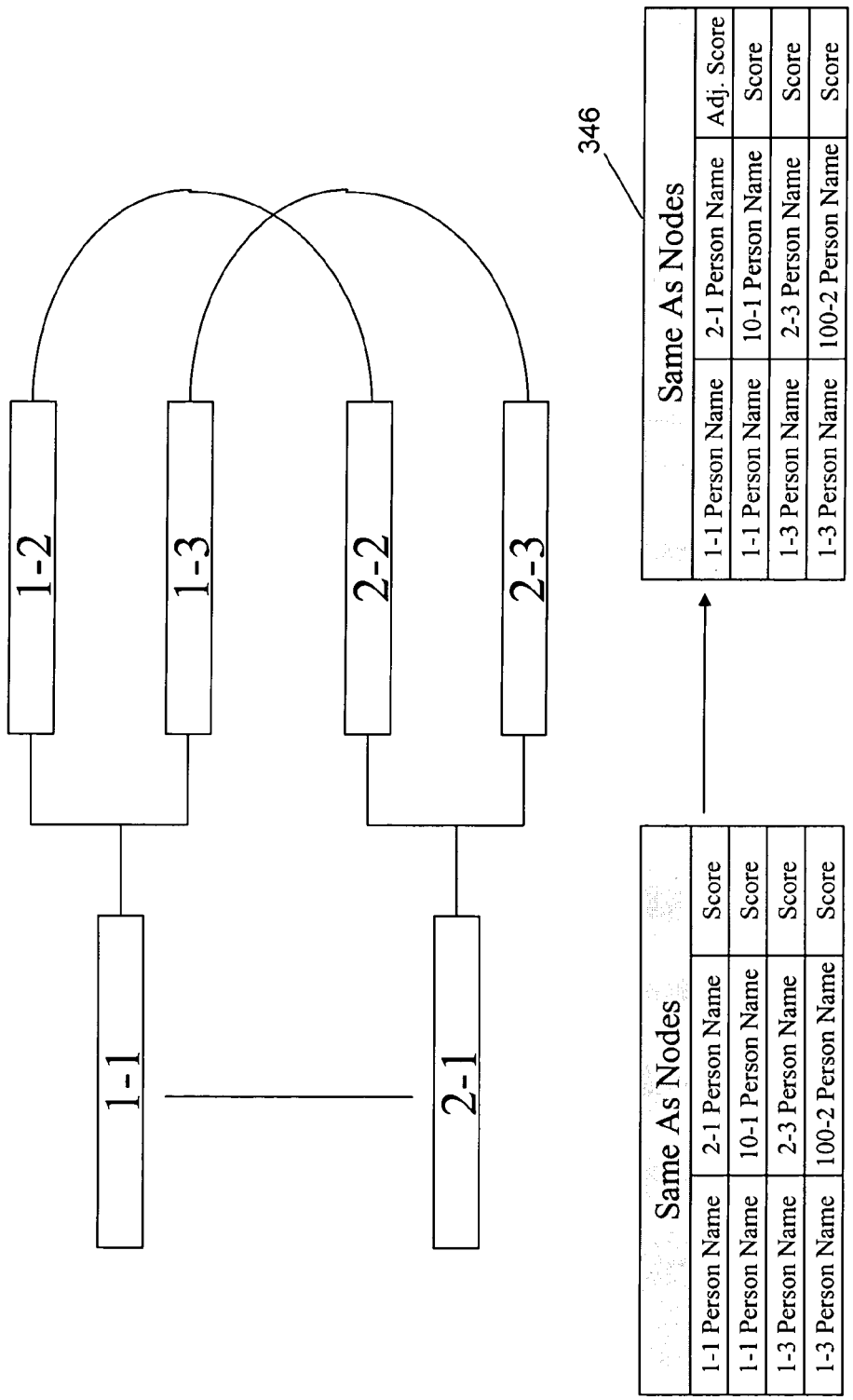
Figure 3N:
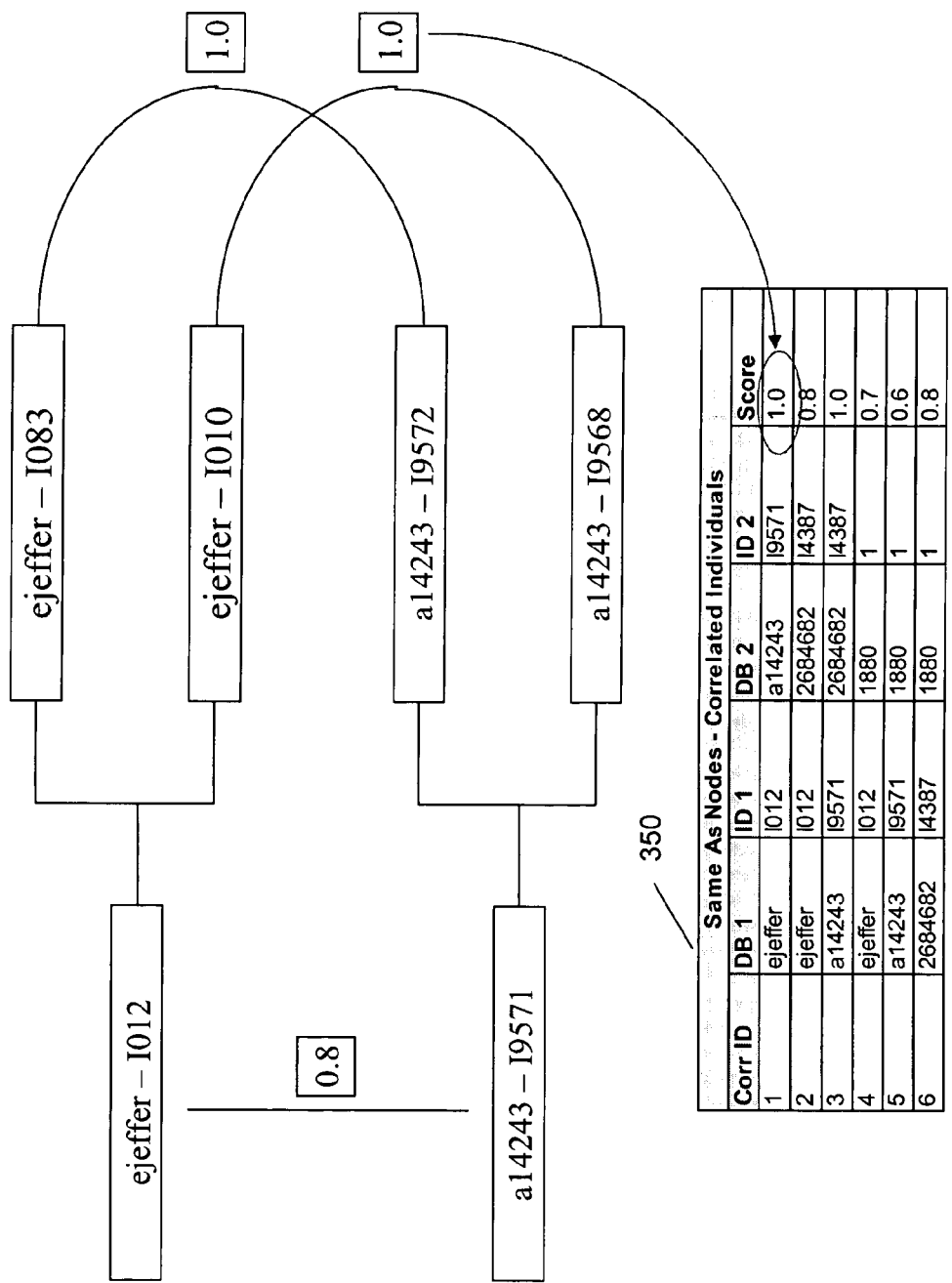

FIGS. 3L and 3M illustrate a further refinement of the correlation process based on relationships. The process once again uses the surname index 316 and a surname partition function 360 to evaluate data stored in the individual links databases 312, 326, 362. The data is extracted into a relationship correlation function 364 and the records identified as being related to same as nodes are compared. The comparison updates the scores calculated previously in the individual correlation process. Thus, the scores in the same as nodes database 346 may be revised base on the comparisons. FIG. 3N illustrates a continuation of the specific example developed thus far.

FIG. 3N relates only to the record identified by Corr ID 1 in the correlated individuals list 350. The initial comparison during individual correlation of records ejerrer-I012 and a14243-I9571 resulted in a score of 0.8. Comparing the corresponding parent records for these two records, however, results in a perfect match in both cases, a score of 1.0. This may be seen by returning to FIG. 3K and comparing NodeIDs 4 and 5 and NodeIDs 7 and 8 of the individual nodes database 310. Thus, the score for Corr ID 1 of the correlated individuals list 350 may be revise upward to 1.0, representing a combination of the three comparisons. Similar relationship comparisons are used to revise the scores for the remaining records.

Figure 3O:
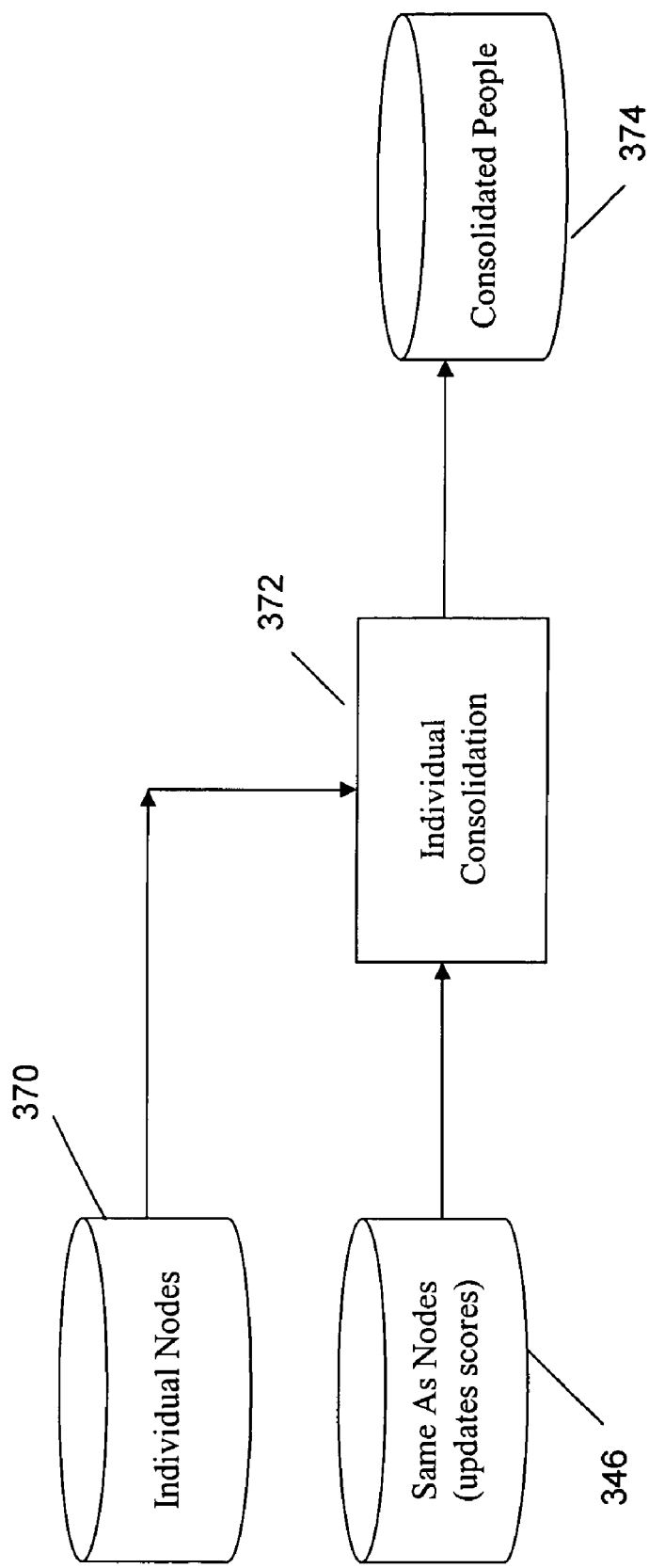
Figure 3P:
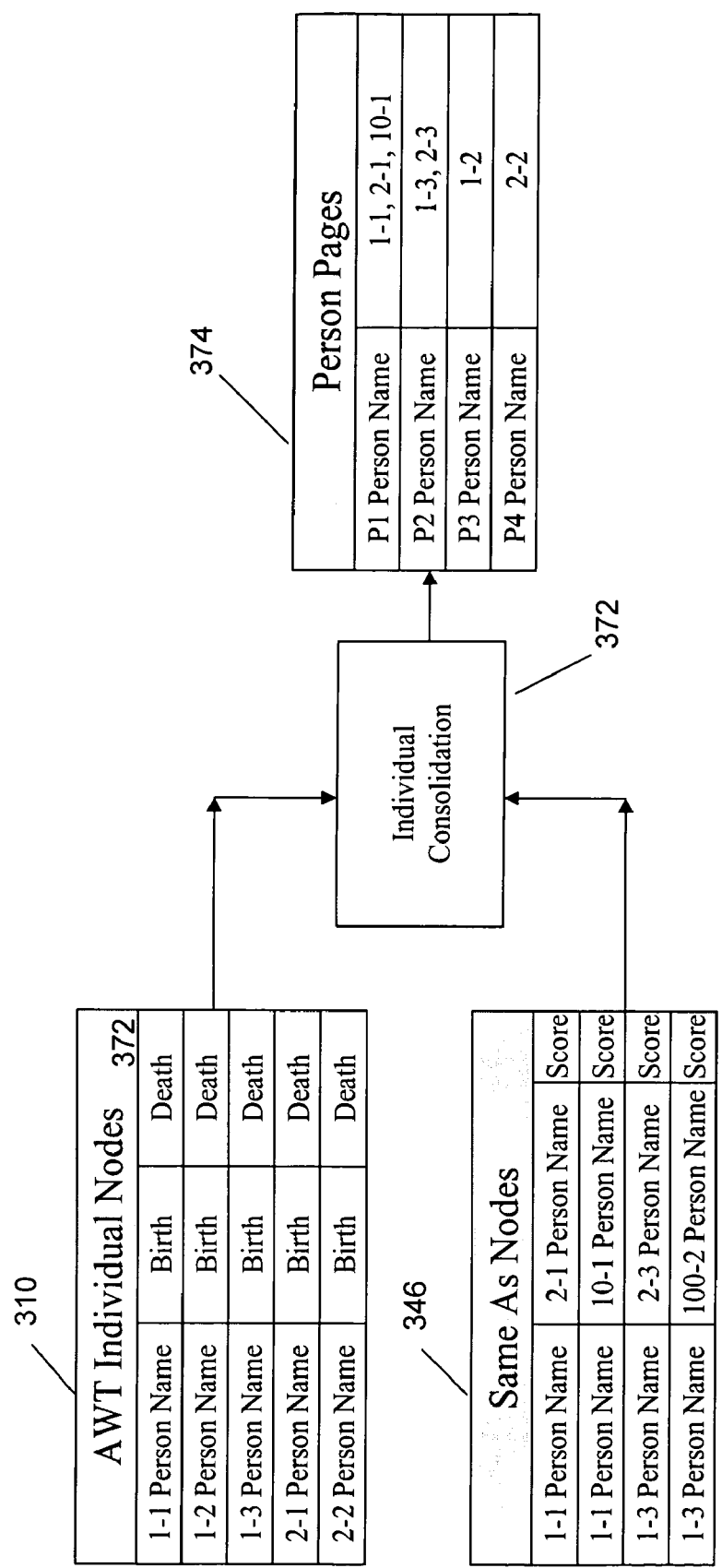

FIGS. 3O and 3P illustrate a continuation of the process in which records identified to be the same person are consolidated. Records from the individual nodes databases 370 (which may include the AWT individual nodes database 310) and records from the same as nodes database 346 are input into an individual consolidation process 372. The output from the individual consolidation process 372 is a record in a person pages database 374 for each group of related individual records. Thus, at the conclusion of the process, a person page exists for each group of individual records from a multitude of different sources, the records determined to have been related by calculating a score based on a comparison of the individual records then adjusting the score by comparing records linked to the source records. If the score is above a pre-determined threshold, then the records are presumed related. A final consolidation for "John William Jefferson" is illustrated in FIG. 3Q.

In FIG. 3Q, the records relating to "John William Jefferson" from the correlated individuals list 350 are condensed into a record in a persons database 380. A person page 382 includes data from the source records and lists alternative information where comparisons did not result in perfect matches. The person page includes the relevant information from the original records in the individual nodes and the individual links databases as well as the data sources. Some embodiments could also include scores for each assertion and relationship. As emphasized previously, although some data may be disregarded for various reasons because it does not exceed a threshold for accuracy or for other reasons, no data is overwritten and therefore lost in the process. A user performing a genealogical investigation is presented with a summary of the most relevant data and may further evaluate its utility. The user is not forced to accept data that someone else has deemed accurate. The user may view alternate data to determine what he or she believes to be most accurate. The user may also later change his or her mind and choose a different set of alternate information. No information is lost in any of this analysis and choosing of data.

The foregoing example depicted in FIGS. 3A-3Q will be understood by those skilled in the art to be non-limiting and merely illustrative of a process for receiving and parsing data from one or more data sources. Similar processes may operate to consolidate relationships and even entire family trees, both of which are included within the scope of embodiments of the present invention and the claims that follow.

Attention is directed to FIGS. 4A-4D, which illustrate a series of screen displays that depict a user interface from a user computer to the host computer system. FIG. 4A depicts a first display screen 400 showing ancestry information about "Ruth Pabodie," the person selected for analysis by the user. The display screen 400, as with the display screens to be described hereinafter, may be displayed for the user in a browser environment, for example. In another example, the display screens may be generated by client software operating on the user's computer. Many other examples are possible. The display screen 400 includes a personal information area 402 listing information about the root person such as birth and death information, spouses, and children. Conveniently, listed information may serve as a hyperlink to more detailed information. The display screen also includes a family tree 404. The family tree depicted in this display screen 400 goes back three generations from the root person, listing Ruth Pabodie's parents, grandparents, and great grandparents. Each person in the tree may be selectable as a hyperlink. An additional information section 406 provides hyperlinks to other resources relevant to the root person. This may include user-submitted information, source records, newspapers from the root person's birth and death dates, and the like.

In some embodiments, attention symbols 408 are used to indicate the presence of alternatives relating to the information marked by the attention symbol. In this example, Ruth Pabodie's father is marked by a attention symbol 408. By selecting the attention symbol 408 next to Ruth's father, the user is presented with the display screen 410 of FIG. 4B.

The display screen 410 of FIG. 4B includes an alternative father selection area 412 having three alternatives. In this example, three records were found that could be related to Ruth as her father. Rather than force the user into using the most likely alternative (the one marked with an asterisk 414), this embodiment of the present invention allows the user to view the data and make a selection using the select buttons 416. Once the user has made the selection, or if the user chooses not to make a selection, the user may select a done button 418 to return to the previous display screen 400. FIG. 4C illustrates a similar display screen 420 for selecting among alternative birth records for Ruth Pabodie. This process was described above with reference to block 220 of FIG. 2. In some embodiments, a different symbol replaces the attention symbol 408 to indicate that the user has chosen among alternatives.

Users may also view the records associated to each of the conflicting data references by clicking on a hyperlinked number or list of source document types to view the records or sources which provided the conflicting data. This will better inform the user where the information came from and allow them to make a more informed decision about which conflicting data may be correct. Users' choices of which alternative data they believe to be correct may also be logged in the system as votes. These votes may then be tallied and used to inform the system of which choice users thought was more likely correct. This voting may then be used to change which piece of alternative data the system believes to be most likely.

As described above with reference to block 224 of FIG. 2, if new information changes inferences prior to a subsequent visit by the user, attention symbols 408 may appear in new places and/or replace symbols showing that the user has selected among alternatives.

Attention symbols may also be used to denote which nodes have new messages, comments, pictures, stories, or other new or modified data. Attention symbols may also be used to help a user locate nodes which are missing key data such as birth date, death place, etc.

Returning to FIG. 4A, a details link 422 allows the user to drill down into more detail information about a subject, in this case Ruth's personal information. By doing so, the user is presented with the display screen 424 of FIG. 4D. This process was described in more detail with respect to block 218 of FIG. 2.

Returning to FIG. 4A, the absence of specific information for a root person may be indicated with brackets 426, as is the case for the day and month that Ruth Pabodie married.

The foregoing display screens are merely exemplary of display screens that may be used in connection with embodiments of the invention. Other embodiments may include more, fewer, or different display screens, as is apparent to those skilled in the are in light of this disclosure.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of consolidating genealogy records, comprising:
   partitioning the records using at least one index file to form one or more partitions, wherein each record represents an individual and includes a name data element and at least one additional data element selected from a group of data elements consisting of birth date, birth place, death date, and death place, and wherein each record has links associated therewith, wherein the links identify related records representing an individual related to the individual of the record;
   sorting the records in a partition based on a data element in the records;
   comparing records within a sort range;
   based on the comparison, identifying same person records, wherein identifying same person records comprises:
      calculating a factor that represents the likelihood that two records represent the same individual;
      comparing the factor to a predetermined threshold;
      based on the comparison, provisionally determining whether the records represent the same individual;
      for each pair of records provisionally determined to represent the same individual:
         calculating a factor that represents the likelihood that respective mother records for the pair of records represent the same mother;
         calculating a factor that represents the likelihood that respective father records for the pair of records represent the same father;
         using the factor that represents the likelihood that the two records represent the same individual, the factor that represents the likelihood that respective mother records for the pair of records represent the same mother, and the factor that represents the likelihood that respective father records for the pair of records represent the same father, calculating a revised factor representing the likelihood that the pair of records represent the same individual;
         comparing the revised factor to a predetermined threshold; and
         based on the comparison, determining that the two records represent the same individual;
   consolidating information in the same person records;
   receiving a request from a user to view at least a portion of the consolidated information for a particular group of same person records; and
   sending a file comprising the portion to the user.

2. The method of claim 1, wherein partitioning the records using at least one index file comprises using a surname index to identify records having the same surnames and grouping those records into a surname partition.

3. The method of claim 2, further comprising using the surname index to identify records having similar surnames and grouping those records into the surname partition.

4. The method of claim 3, wherein using the surname index to identify records having similar surnames comprises using a phonetic algorithm to identify records having similar surnames.

5. The method of claim 4, wherein the phonetic algorithm comprises double metaphone.

6. The method of claim 4, wherein the phonetic algorithm comprises SOUNDEX.

7. The method of claim 1, wherein sorting the records in a partition based on a data element in the records comprises sorting the records based on birth date.

8. The method of claim 1, wherein sorting the records in a partition based on a data element in the records comprises sorting the records based on a selection from the group consisting of name, death data, death place, and birth place.

9. The method of claim 1, wherein the portion comprises a family tree based on consolidated information from a plurality of records.

10. A system for consolidating genealogy records, comprising:
   a processor programmed to:
      partition the records using at least one index file to form one or more partitions, wherein each record represents an individual and includes a name data element and at least one additional data element selected from a group of data elements consisting of birth date, birth place, death date, and death place, and wherein each record has links associated therewith, wherein the links identify related records representing an individual related to the individual of the record;
      sort the records in a partition based on a data element in the records;
      compare records within a sort range;
      based on the comparison, identify same person records, by:
         calculating a factor that represents the likelihood that two records represent the same individual;

comparing the factor to a predetermined threshold;
based on the comparison, provisionally determining whether the records represent the same individual;
for each pair of records provisionally determined to represent the same individual:
calculating a factor that represents the likelihood that respective mother records for the pair of records represent the same mother;
calculating a factor that represents the likelihood that respective father records for the pair of records represent the same father;
using the factor that represents the likelihood that the two records represent the same individual, the factor that represents the likelihood that respective mother records for the pair of records represent the same mother, and the factor that represents the likelihood that respective father records for the pair of records represent the same father, calculating a revised factor representing the likelihood that the pair of records represent the same individual;
comparing the revised factor to a predetermined threshold; and
based on the comparison, determining that the two records represent the same individual;
consolidate information in the same person records;
receive a request from a user to view at least a portion of the consolidated information for a particular group of same person records; and
send a file comprising the portion to the user.

11. The system of claim 10, wherein the processor, in being programmed to partition the records using at least one index file is further programmed to use a surname index to identify records having the same surnames and grouping those records into a surname partition.

12. The system of claim 11, the processor is further programmed to use the surname index to identify records having similar surnames and group those records into the surname partition.

13. The system of claim 12, wherein the processor, in being programmed to use the surname index to identify records having similar surnames is further programmed to use a phonetic algorithm to identify records having similar surnames.

14. The system of claim 13, wherein the phonetic algorithm comprises double metaphone.

15. The system of claim 13, wherein the phonetic algorithm comprises SOUNDEX.

16. The system of claim 10, wherein the processor, in being programmed to sort the records in a partition based on a data element in the records is further programmed to sort the records based on birth date.

17. The system of claim 10, wherein the processor, in being programmed to sort the records in a partition based on a data element in the records is further programmed to sort the records based on a selection from the group consisting of name, death data, death place, and birth place.

18. The system of claim 16, wherein the processor, in being programmed to compare records within a sort window is further programmed to compare records within a birth date range.

19. The system of claim 10, wherein the portion comprises a family tree based on consolidated information from a plurality of records.

20. A method of consolidating genealogy records, comprising:
partitioning the records using at least one index file to form one or more partitions, wherein each record represents an individual and includes a name data element and at least one additional data element selected from a group of data elements consisting of birth date, birth place, death date, and death place, and wherein each record has links associated therewith, wherein the links identify related records representing an individual related to the individual of the record;
sorting the records in a partition based on a data element in the records, wherein sorting the records in a partition based on a data element in the records comprises sorting the records based on birth date;
comparing records within a sort range, wherein comparing records within a sort range comprises comparing records within a birth date range;
based on the comparison, identifying same person records, wherein identifying same person records comprises:
calculating a factor that represents the likelihood that two records represent the same individual;
comparing the factor to a predetermined threshold;
based on the comparison, provisionally determining whether the records represent the same individual;
for each pair of records provisionally determined to represent the same individual:
calculating a factor that represents the likelihood that respective mother records for the pair of records represent the same mother;
calculating a factor that represents the likelihood that respective father records for the pair of records represent the same father;
using the factor that represents the likelihood that the two records represent the same individual, the factor that represents the likelihood that respective mother records for the pair of records represent the same mother, and the factor that represents the likelihood that respective father records for the pair of records represent the same father, calculating a revised factor representing the likelihood that the pair of records represent the same individual;
comparing the revised factor to a predetermined threshold; and
based on the comparison, determining that the two records represent the same individual;
consolidating information in the same person records;
receiving a request from a user to view at least a portion of the consolidated information for a particular group of same person records; and
sending a file comprising the portion to the user.

* * * * *